No. 757,461. PATENTED APR. 19, 1904.
F. J. HERDLE.
MEANS FOR SECURING IMPRESSION SURFACES TO PRINTING ROLLERS.
APPLICATION FILED SEPT. 8, 1903.
NO MODEL.
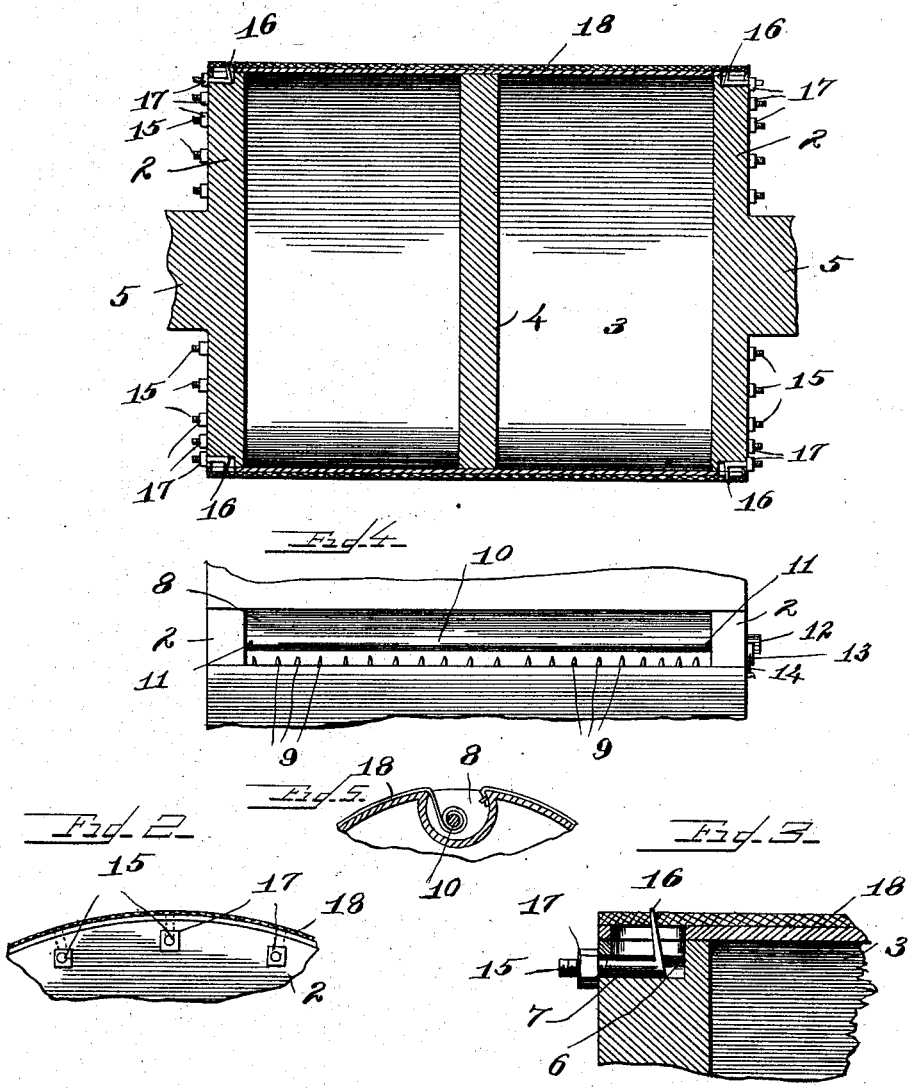

No. 757,461.

Patented April 19, 1904.

UNITED STATES PATENT OFFICE.

FREDERICK J. HERDLE, OF CHICAGO, ILLINOIS.

MEANS FOR SECURING IMPRESSION-SURFACES TO PRINTING-ROLLERS.

SPECIFICATION forming part of Letters Patent No. 757,461, dated April 19, 1904.

Application filed September 8, 1903. Serial No. 172,325. (No model.)

*To all whom it may concern:*

Be it known that I, FREDERICK J. HERDLE, a citizen of the United States, residing at Chicago, in the county of Cook and State of Illinois, have invented certain new and useful Improvements in Means for Securing Impression-Surfaces to Printing-Rollers, of which the following is a specification.

This invention relates to the impression-rollers of printing-presses, and refers particularly to a means for securely holding upon the periphery of such rollers the cover or blanket forming the impression-surface thereof and for laterally stretching said blanket in order to cause it to lie smoothly upon the roller and cover the full width thereof.

In the accompanying drawings, Figure 1 is a longitudinal central section through a roller fitted with this improved surface-holding means. Fig. 2 is a detail end view of said roller. Fig. 3 is an enlarged sectional detail taken on the same line as Fig. 1. Figs. 4 and 5 are details showing the means for securing the ends of the blanket upon the roller.

In the embodiment herein shown of this invention I provide a roller 1, comprising two circular heads 2, a barrel 3, overlying said heads and secured thereto in any suitable manner, and a central strengthening-disk 4. The heads 2 have outwardly-extending bearing-trunnions 5, and in their outer sides, near their peripheries, are provided with radial pockets 6, formed by boring holes 7 into the outer faces of the heads 2 and "routing" or otherwise cutting through the barrel 3.

In order to secure upon the roller 1 the ends of an impression-blanket, the periphery of the barrel 3 is provided with a depression 8, extending longitudinally of said barrel. At one of the edges of this depression the roller is provided with downwardly-extending holding-prongs 9, adapted to engage one end of the blanket, while a shaft 10 is rotatably mounted in suitable openings in the heads 2 and is adapted to receive the other end of said blanket. The shaft 10 is provided with openings 11 for receiving a rod by means of which said shaft is rotated and outside of one of the heads 2 is provided with a ratchet-wheel 12, fixed to said shaft, the teeth of which wheel are engaged by a pawl 13, pivotally mounted upon the side of said head and held in engagement with said ratchet-teeth by means of a spring 14. To hold the edges of the impression-blanket outwardly toward the ends of the roller 1, I provide the hook-bolts 15, one of which lies in each of the pockets 6 and has a point 16, adapted to engage the blanket near one of the side edges thereof. The body portion of each of the hook-bolts 15 is screw-threaded and has a nut 17, by means of which the engaging point is drawn outward within the pocket 6.

The impression-blanket 18 is composed of any suitable impression material—as, for instance, canvas coated with rubber or other similar elastic composition. The end of the blanket 18 intended to be wrapped around the shaft 10 is left uncoated.

In putting a blanket upon the roller 1 the hook-bolts 15 are loosened by unscrewing the nuts 17 until the point 16 of each of the bolts lies against the rear wall of its pocket 6. The blanket is then spread upon the periphery of the roller 1, one end of said blanket hooked over the holding-prongs 9 and the other (uncovered) end wrapped once or twice around the tightening-shaft 10, after which said shaft 10 is rotated to stretch the blanket endwise. The shaft 10 is held from backward rotation by the pawl and ratchet. When the blanket has thus been stretched upon the roller 1, the points 16 of the hook-bolts 15 are forced into the blanket at opposite side edges thereof and the nuts 17 gradually turned down upon their screw-threads, each being given a slight turn, and thus passing around the roller from bolt to bolt until the blanket is drawn tight and smooth upon the surface of the roller. As the stretching-shaft 10 does not extend across the full width of the barrel 3, the end of the blanket intended to be wound upon said roller is notched at each side.

Various changes may be made in the embodiment of the invention herein described without departing from the spirit and scope thereof, wherefore I desire to have it understood that I do not limit myself to the precise details herein set forth.

I claim as my invention—

1. In an impression-roller, in combination, a roller; an impression-blanket lying upon the periphery of said roller; and a peripheral series of hooks adjustably supported in each end of the roller for holding the sides of the blanket with relation to said roller.

2. In an impression-roller, in combination, a roller; an impression-blanket lying upon the periphery of said roller; means for securing upon said roller the ends of said blanket; and a peripheral series of hooks adjustably supported in each end of the roller for holding the sides of the blanket with relation to said roller.

3. In an impression-roller, in combination, a roller provided in its ends with a series of recesses; an impression-blanket lying upon the periphery of said roller; a hook lying in each of the recesses in said roller and adapted to engage the sides of said blanket; and means for moving said hooks to stretch said blanket.

4. In an impression-roller, in combination, a roller provided in its ends with a series of recesses; an impression-blanket lying upon the periphery of said roller; a hook lying in each of said recesses, said hooks having engaging points extending from the periphery of the roller in position to engage the sides of said blanket, each of said hooks also having a screw-threaded portion; and a nut on said screw-threaded portion for moving said hooks to stretch said blanket.

FREDERICK J. HERDLE.

Witnesses:
L. L. MILLER,
GEORGE L. CHINDAHL.